US010216699B2

(12) United States Patent
Aramon et al.

(10) Patent No.: US 10,216,699 B2
(45) Date of Patent: Feb. 26, 2019

(54) METHOD AND SYSTEM FOR SETTING PARAMETERS OF A DISCRETE OPTIMIZATION PROBLEM EMBEDDED TO AN OPTIMIZATION SOLVER AND SOLVING THE EMBEDDED DISCRETE OPTIMIZATION PROBLEM

(71) Applicant: 1QB Information Technologies Inc.

(72) Inventors: Maliheh Aramon, Vancouver (CA); Maritza Hernandez, Burnaby (CA)

(73) Assignee: 1QB Information Technologies Inc., Vancouver (CA)

( * ) Notice: Subject to any disclaimer, the term of this patent is extended or adjusted under 35 U.S.C. 154(b) by 89 days.

(21) Appl. No.: 15/349,091

(22) Filed: Nov. 11, 2016

(65) Prior Publication Data

US 2018/0137083 A1    May 17, 2018

(51) Int. Cl.
*G06F 17/11* (2006.01)
*G06F 17/16* (2006.01)

(52) U.S. Cl.
CPC .............. *G06F 17/11* (2013.01); *G06F 17/16* (2013.01)

(58) Field of Classification Search
CPC ............ G06F 17/11; G06F 17/12; G06F 17/17
See application file for complete search history.

(56) References Cited

U.S. PATENT DOCUMENTS

| 2016/0224515 | A1* | 8/2016 | Ronagh | G06F 17/11 |
| 2016/0321559 | A1* | 11/2016 | Rose | G06N 99/005 |
| 2017/0161612 | A1* | 6/2017 | Hastings | G06N 5/022 |
| 2017/0242824 | A1* | 8/2017 | Karimi | G06F 17/11 |

OTHER PUBLICATIONS

Johnson, MW et al., "Quantum annealing with manufactured spins," Nature 473.7346 (2011): 194-198.

(Continued)

*Primary Examiner* — Chuong D Ngo
(74) *Attorney, Agent, or Firm* — Wiggin and Dana LLP; Gregory S. Rosenblatt; Jonathan D. Hall

(57) ABSTRACT

A method and system are disclosed for setting parameters of a discrete optimization problem embedded to an optimization solver and solving it. The method comprises converting the discrete optimization problem to a K-spin problem, wherein the K-spin problem is defined as $$\min H_{K-spin} = \sum_{j=1}^{N} h_j s_j + \sum_{k=2}^{K} \sum_{j_1 j_2 \cdots j_k} J_{j_1 j_2 \cdots j_k} s_{j_1} s_{j_2} \cdots s_{j_k}$$

wherein parameter K is the order of the discrete optimization problem, wherein parameter J is a coupling value between two vertices and parameter h is a local field value; generating a reduced K-spin problem and a corresponding reduced embedded graph; setting the parameter J of each edge of the reduced embedded graph; setting the parameter h of each given vertex of the reduced embedded graph; setting the parameter J of each edge of the reduced embedded graph connecting two vertices representing the same corresponding variable in the reduced K-spin problem; solving the reduced K-spin problem and combining at least one solution obtained from the optimization solver with a partial solution list.

9 Claims, 6 Drawing Sheets

(56) References Cited

OTHER PUBLICATIONS

Selby, Alex, "Efficient subgraph-based sampling of Ising-type models with frustration," arXiv preprint arXiv:1409.3934 (2014).
Hamze, Firas, and Nando de Freitas, "From fields to trees," Proceedings of the 20th conference on uncertainty in artificial intelligence Jul. 7, 2004: 243-250.
Cai, Jun, William G Macready, and Aidan Roy, "A practical heuristic for finding graph minors," arXiv preprint arXiv:1406.2741 (2014).
Choi, Vicky, "Minor-embedding in adiabatic quantum computation: I. The parameter setting problem," Quantum Information Processing 7.5 (2008): 193-209.
Boixo, Sergio, et al., "Evidence for quantum annealing with more than one hundred qubits," Nature Physics 10.3 (2014): 218-224.

\* cited by examiner

METHOD AND SYSTEM FOR SETTING PARAMETERS OF A DISCRETE OPTIMIZATION PROBLEM EMBEDDED TO AN OPTIMIZATION SOLVER AND SOLVING THE EMBEDDED DISCRETE OPTIMIZATION PROBLEM

FIELD

The invention relates to data processing. More precisely, the invention pertains to a method and system for setting parameters of a discrete optimization problem embedded to an optimization solver and solving the embedded discrete optimization problem using the optimization solver.

BACKGROUND

Discrete optimization is an important branch of applied mathematics. The importance of discrete optimization relies in the vast number of real-world applications that can be formulated as a discrete optimization problem, for example, vehicle routing problem, traveling salesman problem, planning and scheduling, etc.

The solution to a hard discrete optimization problem can be encoded in the ground state of a K-spin problem, also known as a pseudo-Boolean model. Hence, any optimization solver able to find the ground state, i.e., the low-energy state, of a K-spin problem can be used to find the solution to the discrete optimization problem.

Examples of such optimization solvers are the quantum annealer device commercialized by D-Wave Systems (see Johnson, M W et al., "Quantum annealing with manufactured spins," Nature 473.7346 (2011): 194-198), and the Hamze-de Freitas-Selby algorithm (HFS) (see Selby, Alex, "Efficient subgraph-based sampling of Ising-type models with frustration," *arXiv preprint arXiv:*1409.3934 (2014)). (See also Hamze, Firas, and Nando de Freitas, "From fields to trees," Proceedings of the 20th conference on uncertainty in artificial intelligence 7 Jul. 2004: 243-250), which are computational approaches for finding the low-energy state of a 2-spin problem.

Unfortunately, implementing a practical discrete optimization problem is very challenging due to various limitations of the optimization solver used.

For example, one of the main limitations of the D-Wave device is the sparse connectivity of its hardware graph. Specifically, the D-Wave device consists of a hardware graph where each vertex is a physical qubit and each edge is a physical coupler between two qubits.

In the case of the Hamze-de Freitas-Selby optimization solver, there is also a limitation in terms of the connectivity of its variables.

It will therefore be appreciated by the skilled addressee that a discrete optimization problem may require a different connectivity than the one defined by the solver graph. In such case, a mapping from the discrete optimization problem graph to the solver graph is required.

In one embodiment, where the optimization solver is a 2-spin solver, this mapping is commonly achieved by using Minor Embedding (ME) techniques. It is worth mentioning that if the optimization solver is a K-spin solver with K>2, it has been assumed that the optimization solver's variables can be arranged such that a Minor Embedding approach is still needed. An example of such arrangement is a hypergraph where the edges, also known as hyperedges, can connect up to and including K vertices, but it is not fully connected.

In a Minor Embedding approach, a graph G representing an optimization problem is replaced by a subgraph $G_{emb}$ of the solver graph where each of graph G's vertices is replaced by a connected subgraph of the optimization solver graph.

After an embedding representation is found, the next step is to determine the corresponding parameters of the embedded problem. This problem is referred to as the parameter setting problem. The skilled addressee will appreciate that the reduction of an optimization problem to its minor embedding form is correct as long as there is a one-to-one correspondence between the ground states of both representations G and $G_{emb}$.

Various algorithms have been disclosed to find a minor embedding.

For instance, an example of an algorithm is disclosed by Cai et al. (see Cai, Jun, William G Macready, and Aidan Roy, "A practical heuristic for finding graph minors," *arXiv preprint arXiv:*1406.2741 (2014)).

A method for performing a parameter setting has been disclosed by Choi (See Choi, Vicky, "Minor-embedding in adiabatic quantum computation: I. The parameter setting problem," Quantum Information Processing 7.5 (2008): 193-209). In the approach disclosed by Choi, the parameter setting problem is defined for a 2-spin problem on a specific quantum annealer, i.e., the D-Wave device.

Specifically, Choi addressed the parameter setting problem by considering that the connected subgraphs representing variables in graph G are subtrees of the hardware graph. Unfortunately, this condition does not necessarily hold for all embedded problems. This is, therefore, a serious limitation.

Other disadvantages of the prior-art methods are that they require more computational resources and are limited to 2-spin solvers.

There is a need for a method and system that will overcome at least one of the above-identified drawbacks.

Features of the invention will be apparent from review of the disclosure, drawings and description of the invention below.

BRIEF SUMMARY

According to a broad aspect, there is disclosed a method for setting parameters of a discrete optimization problem embedded to an optimization solver and solving the embedded discrete optimization problem using the optimization solver, the method comprising use of a processing unit for receiving an indication of a discrete optimization problem and a corresponding embedded graph $G_{emb}$ into the solver graph; converting the discrete optimization problem to a K-spin problem, wherein the K-spin problem is defined as:

$$\min H_{K-spin} = \sum_{j=1}^{N} h_j s_j + \sum_{k=2}^{K} \sum_{j_1 j_2 \cdots j_k} J_{j_1 j_2 \cdots j_k} s_{j_1} s_{j_2} \cdots s_{j_k}$$

wherein parameter K is the order of the discrete optimization problem, further wherein parameter J is a coupling value between two vertices and parameter h is a local field value; for each variable j of the K-spin problem associated with a corresponding node: computing a parameter $C_j$ associated with the local field and the coupling values of each adjacent edge to the corresponding node, evaluating if a variable selection criterion is met with the computed parameter $C_j$, if the variable selection criterion is met with the computed parameter $C_j$: setting a value of a selected variable j to a given fixed value, adding the selected variable j with the given fixed value to a partial solution list, and removing the selected variable from the K-spin problem and from the corresponding embedded graph to thereby provide a reduced K-spin problem and a corresponding reduced embedded graph, the corresponding reduced embedded graph comprising a plurality of edges and vertices; setting the parameter J of each edge of the reduced embedded graph corresponding to an existing edge in the corresponding reduced K-spin problem by distributing the parameter J in the reduced K-spin problem according to a defined distributing strategy; setting the parameter h of each given vertex of the reduced embedded graph by distributing the corresponding parameter h in the reduced K-spin problem using a linear combination of a corresponding parameter C for the given vertex and the parameter J of each edge of the corresponding variable in the reduced K-spin problem adjacent to the given vertex; setting the parameter J of each edge of the reduced embedded graph connecting two vertices representing the same corresponding variable in the reduced K-spin problem using a distribution of the parameter C of the corresponding variable in the reduced K-spin problem calculated previously; solving the reduced K-spin problem with the optimization solver using the corresponding reduced embedded graph and its corresponding h and J parameters to provide at least one solution and combining the at least one solution obtained from the optimization solver with the partial solution list to thereby provide a solution to the discrete optimization problem.

In accordance with an embodiment, the discrete optimization problem is formulated as a quadratic optimization problem.

In accordance with another embodiment, the discrete optimization problem is formulated as a 2-spin problem.

In accordance with an embodiment, the indication of a discrete optimization problem and the corresponding embedded graph $G_{emb}$ into the solver graph are obtained from one of a user interacting with the processing unit, a memory unit operatively connected to the processing unit and a remote processing device operatively connected to the processing unit.

In accordance with an embodiment, the parameter $C_j$ is defined as $$C_j = \sum_{i \in lnbr(j)} |J_{ij}| - |h_j|,$$

wherein lnbr(j) is a set of neighboring vertices which includes all vertices that are connected to variable j by edges or hyperedges.

In accordance with an embodiment, the evaluating if a variable selection criterion is met with the computed parameter $C_j$ comprises determining if the computed parameter $C_j$ is negative.

In accordance with an embodiment, the defined distributing strategy comprises equally distributing the parameter J in the reduced K-spin problem.

In accordance with an embodiment, the optimization solver comprises a quantum annealer.

In accordance with a broad aspect, there is disclosed a digital computer for setting parameters of a discrete optimization problem embedded to an optimization solver and solving the embedded discrete optimization problem using the optimization solver, the digital computer comprising a central processing unit; a display device; a communication port; a memory unit comprising an application for setting parameters of a discrete optimization problem embedded to an optimization solver and solving the embedded discrete optimization problem using the optimization solver, the application comprising instructions for receiving an indication of a discrete optimization problem and a corresponding embedded graph $G_{emb}$ into the solver graph; instructions for converting the discrete optimization problem to a K-spin problem, wherein the K-spin problem is defined as:

$$\min H_{K-spin} = \sum_{j=1}^{N} h_j s_j + \sum_{k=2}^{K} \sum_{j_1 j_2 \ldots j_k} J_{j_1 j_2 \ldots j_k} s_{j_1} s_{j_2} \ldots s_{j_k}$$

wherein parameter K is the order of the discrete optimization problem, further wherein parameter J is a coupling value between two vertices and parameter h is a local field value; instructions for, for each variable j of the K-spin problem associated with a corresponding node, computing a parameter $C_j$ associated with the local field and the coupling values of each adjacent edge to the corresponding node, evaluating if a variable selection criterion is met with the computed parameter $C_j$, if the variable selection criterion is met: setting a value of a selected variable j to a given fixed value, adding the selected variable j with the given fixed value to a partial solution list, and removing the selected variable from the K-spin problem and from the corresponding embedded graph to thereby provide a reduced K-spin problem and a corresponding reduced embedded graph, the corresponding reduced embedded graph comprising a plurality of edges and vertices; instructions for setting the parameter J of each edge of the reduced embedded graph corresponding to an existing edge in the corresponding reduced K-spin problem by distributing the parameter J in the reduced K-spin problem according to a defined distributing strategy; instructions for setting the parameter h of each given vertex of the reduced embedded graph by distributing the corresponding parameter h in the reduced K-spin problem using a linear combination of a corresponding parameter C for the given vertex and the parameter J of each edge of the corresponding variable in the reduced K-spin problem adjacent to the given vertex; instructions for setting the parameter J of each edge of the reduced embedded graph connecting two vertices representing the same corresponding variable in the reduced K-spin problem using a distribution of the parameter C of the corresponding variable in the reduced K-spin problem calculated previously; instructions for solving the reduced K-spin problem with the optimization solver using the corresponding reduced embedded graph and its corresponding h and J parameters to provide at least one solution; and instructions for combining the at least one solution obtained from the optimization solver with the partial solution list to thereby provide a solution to the discrete optimization problem; and a data bus for interconnecting the central processing unit, the display device, the communication port and the memory unit.

According to a broad aspect, there is disclosed a non-transitory computer-readable storage medium for storing computer-executable instructions which, when executed, cause a digital computer to perform a method for setting parameters of a discrete optimization problem embedded to an optimization solver and solving the embedded discrete optimization problem using the optimization solver, the method comprising use of a processing unit for receiving an indication of a discrete optimization problem and a corresponding embedded graph $G_{emb}$ into the solver graph; converting the discrete optimization problem to a K-spin problem, wherein the K-spin problem is defined as:

$$\min H_{K-spin} = \sum_{j=1}^{N} h_j s_j + \sum_{k=2}^{K} \sum_{j_1 j_2 \ldots j_k} J_{j_1 j_2 \ldots j_k} s_{j_1} s_{j_2} \ldots s_{j_k}$$

wherein parameter K is the order of the discrete optimization problem, further wherein parameter J is a coupling value between two vertices and parameter h is a local field value; for each variable j of the K-spin problem associated with a corresponding node: computing a parameter $C_j$ associated with the local field and the coupling values of each adjacent edge to the corresponding node, evaluating if a variable selection criterion is met with the computed parameter $C_j$, if the variable selection criterion is met: setting a value of a selected variable j to a given fixed value, adding the selected variable j with the given fixed value to a partial solution list, and removing the selected variable from the K-spin problem and from the corresponding embedded graph to thereby provide a reduced K-spin problem and a corresponding reduced embedded graph, the corresponding reduced embedded graph comprising a plurality of edges and vertices; setting the parameter J of each edge of the reduced embedded graph corresponding to an existing edge in the corresponding reduced K-spin problem by distributing the parameter J in the reduced K-spin problem according to a defined distributing strategy; setting the parameter h of each given vertex of the reduced embedded graph by distributing the corresponding parameter h in the reduced K-spin problem using a linear combination of a corresponding parameter C for the given vertex and the parameter J of each edge of the corresponding variable in the reduced K-spin problem adjacent to the given vertex; setting the parameter J of each edge of the reduced embedded graph connecting two vertices representing the same corresponding variable in the reduced K-spin problem using a distribution of the parameter C of the corresponding variable in the reduced K-spin problem calculated previously; solving the reduced K-spin problem with the optimization solver using the corresponding reduced embedded graph and its corresponding h and J parameters to provide at least one solution and combining the at least one solution obtained from the optimization solver with the partial solution list to thereby provide a solution to the discrete optimization problem.

A first advantage of the method disclosed herein is that it is not restricted to 2-spin problems and it can be used to set the parameters of an embedded graph of a K-spin (K≥2) problem on any K-spin optimization solver whose graph has a different connectivity than the problem graph.

A second advantage of the method disclosed herein is that it eliminates the computational cost of finding parameters empirically.

A third advantage of the method disclosed herein is that it may further reduce computational cost compared to the existing prior are methods since there is no need to find a spanning tree of the connected subgraph representing one variable.

An advantage of the method disclosed herein is that the processing of a system implementing the method for determining the parameters of a discrete optimization problem embedded to an optimization solver is greatly improved.

Another advantage of the method disclosed herein is that the processing of a system implementing the method for solving a discrete optimization problem embedded to an optimization solver is greatly improved.

It will be appreciated that the method for setting the parameters in an embedded problem which can be a K-spin (K≥2) whose subgraphs representing variables of graph G is not restricted to any particular structure which is of great advantage.

BRIEF DESCRIPTION OF THE DRAWINGS

In order that the invention may be readily understood, embodiments of the invention are illustrated by way of example in the accompanying drawings.

Figure 1:
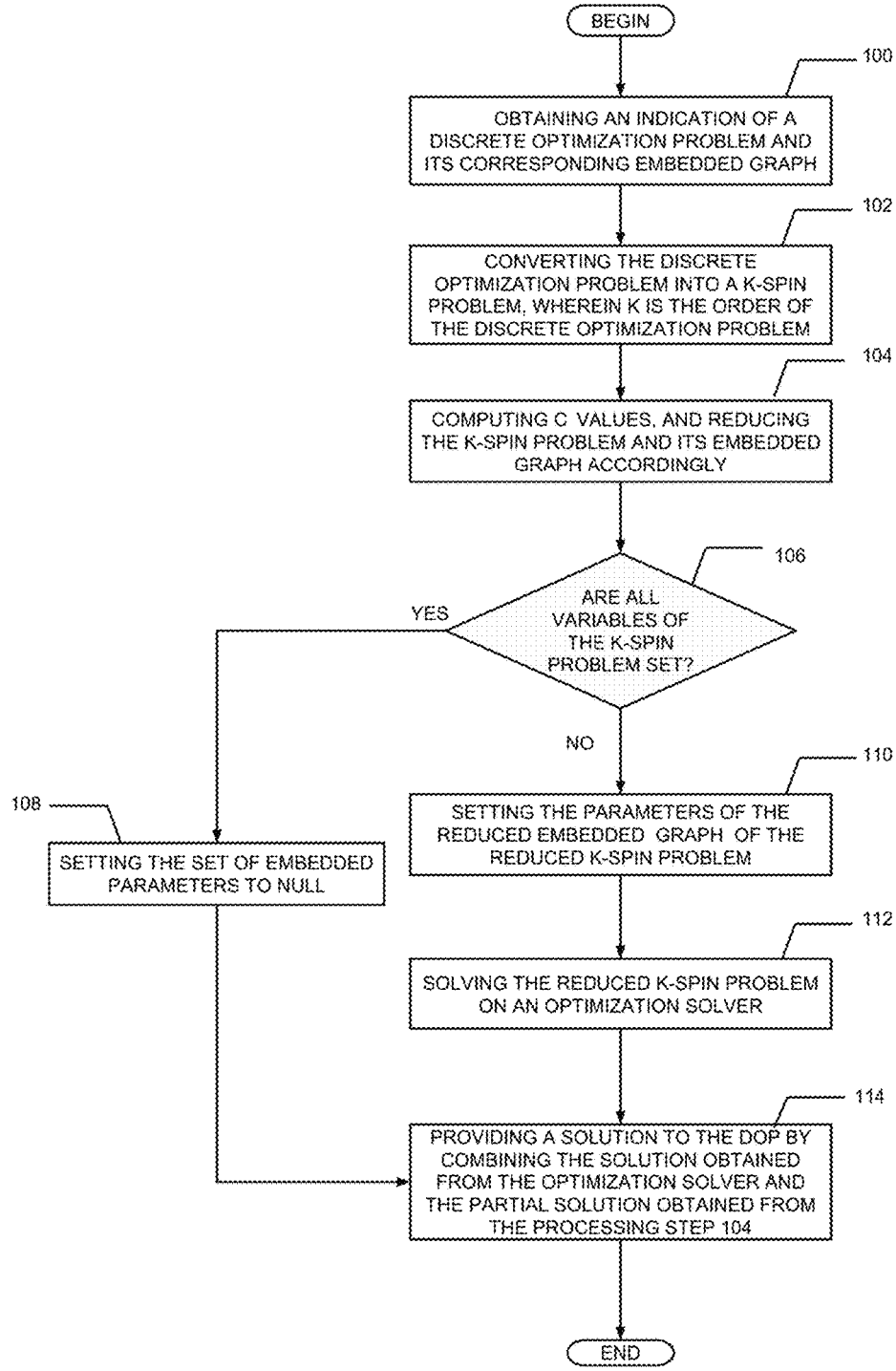
FIG. 1 is a flowchart which shows an embodiment of a method for solving a discrete optimization problem using an optimization solver. The method comprises, inter alia, setting up the parameters of a graph of the discrete optimization problem embedded into a solver graph of the optimization solver and consequently providing an indication of the solution to the discrete optimization problem.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment"

and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain.

The term "i.e." and like terms mean "that is," and thus limit the terms or phrases they explain.

The term "Discrete optimization problem (DOP)" and like terms mean an optimization problem whose decision variables' domains are discrete values. The "K-spin problem" (See Denchev, Vasil S., et al. "What is the Computational Value of Finite Range Tunneling?" *arXiv preprint arXiv:1512.02206 (2015)*) is defined as $$\min H_{K-spin} = \sum_{j=1}^{N} h_j s_j + \sum_{k=2}^{K} \sum_{j_1, j_2 \ldots j_k} J_{j_1, j_2 \ldots j_k} s_{j_1} s_{j_2} \ldots s_{j_k}$$

wherein N is the size of the problem, $s_j = \pm 1$ are spin variables, the local field values $h_j$ and the coupling values $J_{j_1 j_2 \ldots j_k}$ are real values.

The term "optimization solver" means any physical device or algorithm capable of determining the low energy state solutions or the lowest energy state solution of a K-spin optimization problem.

The term "solver graph" means the structure of the optimization solver in which the variables are arranged. For example, the solver graph may be a graph or a hypergraph where edges connect two or multiple vertices. In the case of the D-Wave 2× quantum annealer, the solver graph is a chimera graph (Boixo, Sergio, et al., "Evidence for quantum annealing with more than one hundred qubits," *Nature Physics* 10.3 (2014): 218-224).

The term "problem graph" means the graph or hypergraph of the discrete optimization problem where each vertex is a variable and each edge (hyperedge) is the connection between two (multiple) variables.

The term "embedded graph" means the problem graph mapped into the solver graph. In the embedded graph, each vertex of the problem graph is replaced by a connected subgraph (not subhypergraph) of the solver graph. Edges of a connected subgraph representing a vertex are referred to as internal edges. Edges or hyperedges of the embedded graph connecting two or multiple vertices are referred to as external edges.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to a method and system for setting the parameters of a discrete optimization problem embedded to an optimization solver and its use for solving the embedded discrete optimization problem using the optimization solver.

Figure 5:
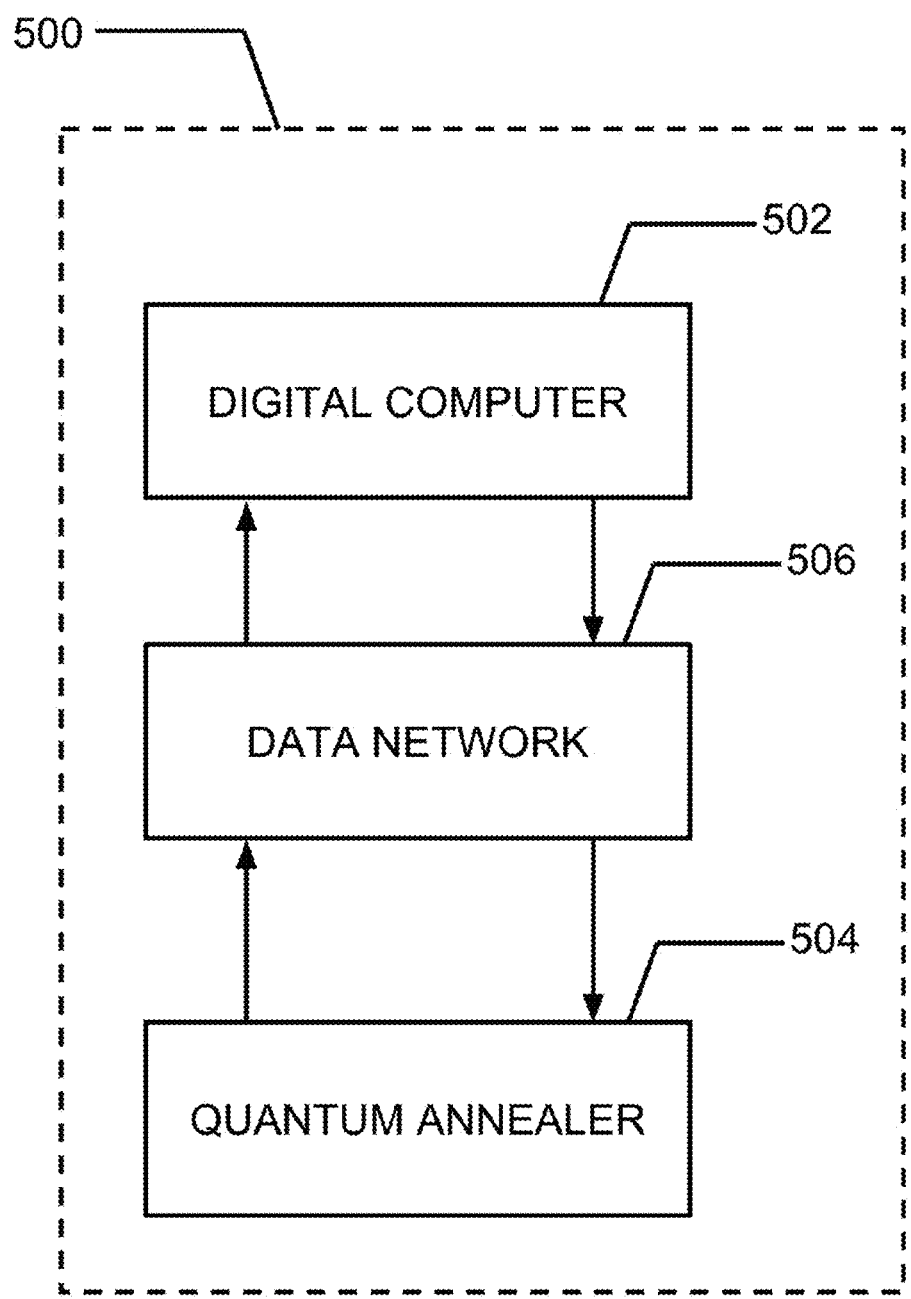
FIG. 5 illustrates a system in which the method for setting parameters of a discrete optimization problem embedded to an optimization solver and solving the embedded discrete optimization problem may be implemented. The system comprises a digital computer and a quantum annealer.

Now referring to FIG. 5, there is shown an embodiment of a system 500 in which the method for setting parameters of a discrete optimization problem embedded to an optimization solver and solving the embedded discrete optimization problem may be implemented.

The system 500 comprises a digital computer 502 and a quantum annealer 504.

The digital computer 502 is used for setting parameters of a discrete optimization problem embedded to an optimization solver and for solving the embedded discrete optimization problem using the quantum annealer 504.

It will be appreciated that the quantum annealer 504 may be of various types. In one embodiment and as explained above, the quantum annealer 504 is D-Wave 2× manufactured by D-Wave Systems Inc.

It will be appreciated that the digital computer 502 is operatively coupled to the quantum annealer 504.

In one embodiment, the digital computer 502 is operatively coupled to the quantum annealer 504 using a data network 506. The data network 506 may be of various types. In one embodiment, the data network 506 is selected from a group consisting of a local area network, a metropolitan area network and a wide area network. In one embodiment, the wide area network comprises the Internet.

It will be further appreciated by the skilled addressee that the digital computer 502 may be any type of computer.

In one embodiment, the digital computer 502 is selected from a group consisting of desktop computers, laptop computers, tablet PCs, servers, smartphones, etc.

While there has been disclosed in FIG. 5 an embodiment of a system wherein the quantum annealer 504 is the optimization solver, it will be appreciated that in an alternative embodiment, not shown, the optimization solver is implemented as an algorithm in a processing device. In one embodiment the processing device is the digital computer 502. In an alternative embodiment, the processing device implementing the optimization solver is operatively connected to the digital computer 502.

Figure 6:
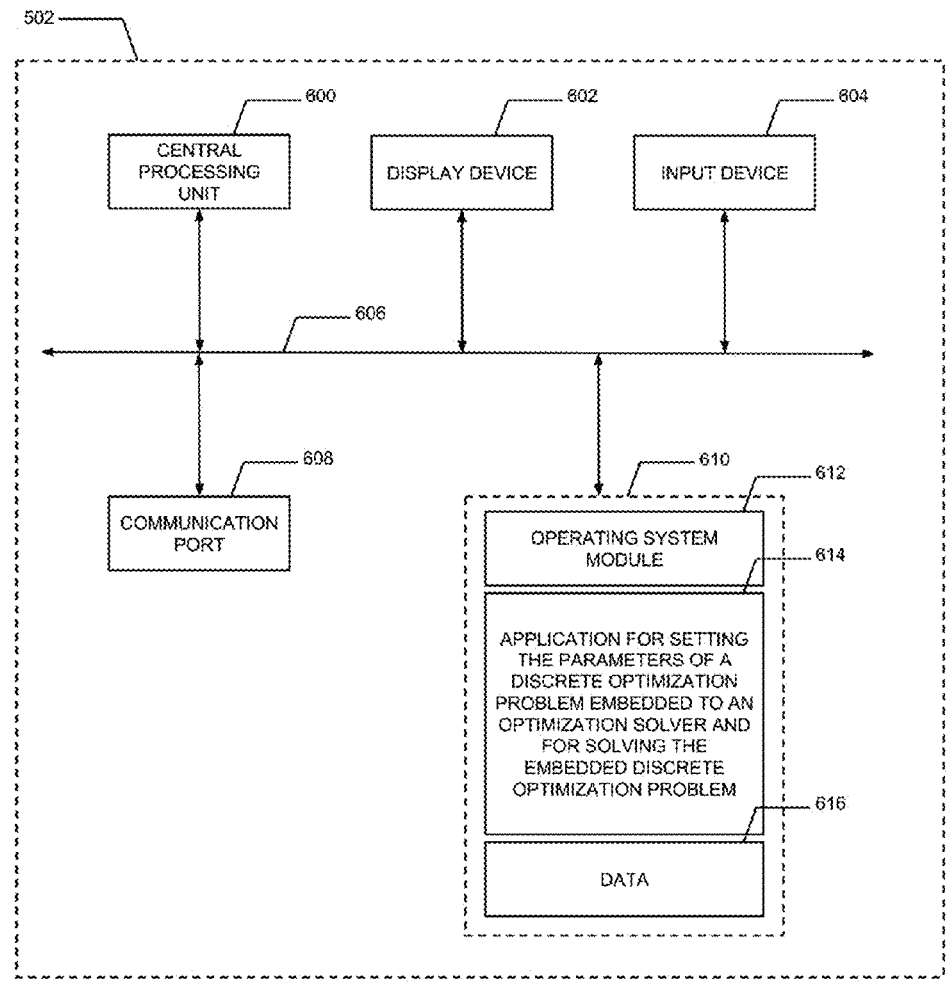
FIG. 6 is a diagram which shows an embodiment of a digital computer which may be used in a system in which the method for setting parameters of a discrete optimization problem embedded to an optimization solver and solving the embedded discrete optimization problem may be implemented.

Now referring to FIG. 6, there is shown an embodiment of a digital computer 502. It will be appreciated that the digital computer 502 may also be broadly referred to as a processing unit.

In this embodiment, the digital computer 502 comprises a central processing unit (CPU) 600, also referred to as a microprocessor or a processor, a display device 602, input devices 604, communication ports 608, a data bus 606 and a memory unit 610.

The CPU 600 is used for processing computer instructions. The skilled addressee will appreciate that various embodiments of the CPU 600 may be provided.

In one embodiment, the central processing unit 600 is a CPU Core i5-3210M running at 2.5 GHz and manufactured by Intel™.

The display device 602 is used for displaying data to a user. The skilled addressee will appreciate that various types of display device 602 may be used.

In one embodiment, the display device 602 is a standard liquid-crystal display (LCD) monitor.

The communication ports 608 are used for sharing data with the digital computer 502.

The communication ports 608 may comprise, for instance, a universal serial bus (USB) port for connecting a keyboard and a mouse to the digital computer 502.

The communication ports 608 may further comprise a data network communication port, such as an IEEE 802.3 port, for enabling a connection of the digital computer 502 with another computer via a data network.

The skilled addressee will appreciate that various alternative embodiments of the communication ports 608 may be provided.

In one embodiment, the communication ports 608 comprise an Ethernet port.

The memory unit 610 is used for storing computer-executable instructions.

It will be appreciated that the memory unit 610 comprises, in one embodiment, an operating system module 612.

It will be appreciated by the skilled addressee that the operating system module 612 may be of various types.

In an embodiment, the operating system module 612 is OS X Yosemite (Version 10.10.5) manufactured by Apple™.

The memory unit 610 further comprises an application for setting the parameters of a discrete optimization problem embedded to an optimization solver and for solving the embedded discrete optimization problem 614.

The application for setting the parameters of a discrete optimization problem embedded to an optimization solver and for solving the embedded discrete optimization problem 614 comprises instructions for receiving an indication of a discrete optimization problem and a corresponding embedded graph $G_{emb}$ into the solver graph.

The application for setting the parameters of a discrete optimization problem embedded to an optimization solver and for solving the embedded discrete optimization problem 614 comprises instructions for converting the discrete optimization problem to a K-spin problem, wherein the K-spin problem is defined as:

$$\min H_{K-spin} = \sum_{j=1}^{N} h_j s_j + \sum_{k=2}^{K} \sum_{j_1 j_2 \cdots j_k} J_{j_1 j_2 \cdots j_k} s_{j_1} s_{j_2} \cdots s_{j_k},$$

wherein parameter K is the order of the discrete optimization problem, further wherein parameter J is a coupling value between two vertices and parameter h is a local field value.

The application for setting the parameters of a discrete optimization problem embedded to an optimization solver and for solving the embedded discrete optimization problem 614 comprises instructions for, for each variable j of the K-spin problem associated with a corresponding node, computing a parameter $C_j$ associated with the local field and the coupling values of each adjacent edge to the corresponding node.

The application for setting the parameters of a discrete optimization problem embedded to an optimization solver and for solving the embedded discrete optimization problem 614 comprises instructions for evaluating if a variable selection criterion is met with the computed parameter $C_j$.

The application for setting the parameters of a discrete optimization problem embedded to an optimization solver and for solving the embedded discrete optimization problem 614 comprises instructions for, if the variable selection criterion is met, setting a value of a selected variable j to a given fixed value, adding the selected variable j with the given fixed value to a partial solution list, and removing the selected variable from the K-spin problem and from the corresponding embedded graph to thereby provide a reduced K-spin problem and a corresponding reduced embedded graph, the corresponding reduced embedded graph comprising a plurality of edges and vertices.

The application for setting the parameters of a discrete optimization problem embedded to an optimization solver and for solving the embedded discrete optimization problem 614 comprises instructions for setting the parameter J of each edge of the reduced embedded graph corresponding to an existing edge in the corresponding reduced K-spin problem by distributing the parameter J in the reduced K-spin problem according to a defined distributing strategy.

The application for setting the parameters of a discrete optimization problem embedded to an optimization solver and for solving the embedded discrete optimization problem 614 comprises instructions for setting the parameter h of each given vertex of the reduced embedded graph by distributing the corresponding parameter h in the reduced K-spin problem using a linear combination of a corresponding parameter C for the given vertex and the parameter J of each edge of the corresponding variable in the reduced K-spin problem adjacent to the given vertex.

The application for setting the parameters of a discrete optimization problem embedded to an optimization solver and for solving the embedded discrete optimization problem 614 comprises instructions for setting the parameter J of each edge of the reduced embedded graph connecting two vertices representing the same corresponding variable in the reduced K-spin problem using a distribution of the parameter C of the corresponding variable in the reduced K-spin problem calculated previously.

The application for setting the parameters of a discrete optimization problem embedded to an optimization solver and for solving the embedded discrete optimization problem 614 comprises instructions for solving the reduced K-spin problem with the optimization solver using the corresponding reduced embedded graph and its corresponding h and J parameters to provide at least one solution.

The application for setting the parameters of a discrete optimization problem embedded to an optimization solver and for solving the embedded discrete optimization problem 614 comprises instructions for combining the at least one solution obtained from the optimization solver with the partial solution list to thereby provide a solution to the discrete optimization problem.

The memory unit 610 further comprises data 616. The data 616 is used by the application for setting the parameters of a discrete optimization problem embedded to an optimization solver and for solving the embedded discrete optimization problem 614.

In an alternative embodiment wherein the quantum annealer 502 is not used, the optimization solver may be implemented in one embodiment in the digital computer 502. In such embodiment, the optimization solver may be implemented in the memory unit 610 of the digital computer 502. In an alternative embodiment, mentioned above, the optimization solver is implemented in a remote processing unit operatively connected to the digital computer 502.

Now referring to FIG. 1, there is shown an embodiment of the method for setting parameters of a discrete optimization problem embedded to an optimization solver and solving the embedded discrete optimization problem using the optimization solver.

According to processing step 100, an indication of a discrete optimization problem and its corresponding embedded graph are obtained.

In one embodiment, the discrete optimization problem is formulated as a quadratic optimization (QUBO) problem. In an alternative embodiment, the discrete optimization problem is formulated as a 2-spin problem, known as an Ising problem.

It will be appreciated that the indication of the discrete optimization problem and its corresponding embedded graph may be obtained according to various embodiments. In accordance with one embodiment, the indication of the discrete optimization problem and its corresponding embedded graph are provided by a user interacting with the digital computer 502. In an alternative embodiment, the indication of the discrete optimization problem and its corresponding embedded graph are obtained from the memory unit 610 of the digital computer 502. In a further alternative embodiment, the indication of the discrete optimization problem and its corresponding embedded graph are obtained from a remote processing unit, not shown, operatively connected with the digital computer 502. The remote processing unit may be operatively connected to the digital computer 502 according to various embodiments. In accordance with one embodiment, the remote processing unit is operatively connected to the digital computer 502 using a data network. In one embodiment, the data network comprises the Internet.

According to processing step 102, the discrete optimization problem is converted into a K-spin problem, wherein the K-spin problem is defined as $$\min H_{K-spin} = \sum_{j=1}^{N} h_j s_j + \sum_{k=2}^{K} \sum_{j_1 j_2 \cdots j_k} J_{j_1 j_2 \cdots j_k} s_{j_1} s_{j_2} \cdots s_{j_k},$$

wherein parameter K is the order of the discrete optimization problem, further wherein parameter J is a coupling value between two vertices and parameter h is a local field value. It will be appreciated that the discrete optimization problem is converted into the K-spin problem using the digital computer 502.

It will be appreciated by the skilled addressee that the discrete optimization problem refers to the optimization of objective functions involving discrete parameter spaces, which can arise in diverse applications including, but not limited to, machine learning, dynamic modelling, and scheduling.

It will be appreciated that a general discrete optimization problem has the form $\max\{f(x)|x \varepsilon D, C\}$, wherein $x = (x_1, \ldots, x_n)$ is a tuple of variables, and $C = \{C_1, \ldots, C_m\}$ is a constraint set, which could be empty in some cases.

For instance, the maximum weighted independent set problem is a discrete optimization problem. The goal in the maximum weighted independent set problem is to find the subset of vertices on a graph G=(V, E) whose weights sum to the maximum possible value such that there is no edge connecting a pair of selected vertices. In order to formulate the maximum weighted independent set problem as an optimization problem, let variable $x_i$ indicate whether vertex i is selected ($x_i=1$) or not ($x_i=0$) for i$\varepsilon$V, thus the domain is $D_i=\{0, 1\}$. The objective function is $$f(x) = \sum_{i=1}^{n} h_i x_i,$$

wherein $h_i$ is the weight of vertex i and the constraint set is $C=\{x_i+x_j \leq 1|(i,j)\varepsilon E\}$. It will be appreciated that in general, any discrete optimization problem may be written into a K-spin problem, wherein K is the degree of the discrete optimization problem. In the case of the maximum weighted independent set problem K=2. Still in the case of the maximum weighted independent set problem, the constraint is represented by penalties of the form $Mx_i x_j$ for all (i,j)$\varepsilon$E and $M_{ij}>\min(h_i,h_j)$. Thus the total objective function for the maximum weighted independent set problem is $$\max\left(\sum_{i} h_i x_i - \sum_{(i,j)} M_{ij} J_{ij} x_i x_j\right),$$

wherein $J_{ij}=1$ if there is an edge between vertex i and j, and $J_{ij}=0$ otherwise.

Since the domain of the variables defining this problem is $D_i=\{0, 1\}$, this formulation is called a quadratic unconstrained binary optimization (QUBO) problem. In order to formulate the maximum weighted independent set problem as a 2-spin problem, the transformation s=2x−1 is applied, which will transform the domain to $D_i=\{-1,+1\}$.

Still referring to FIG. 1 and according to processing step 104, a parameter $C_j$ associated with a local field value and a coupling value of each adjacent edge to the corresponding node j in the K-spin problem is computed. It will be appreciated that the computing is performed using the digital computer 502. It will be further appreciated that if the variables in the K-spin problem are reduced, the corresponding embedded graph is also reduced accordingly.

Figure 2:
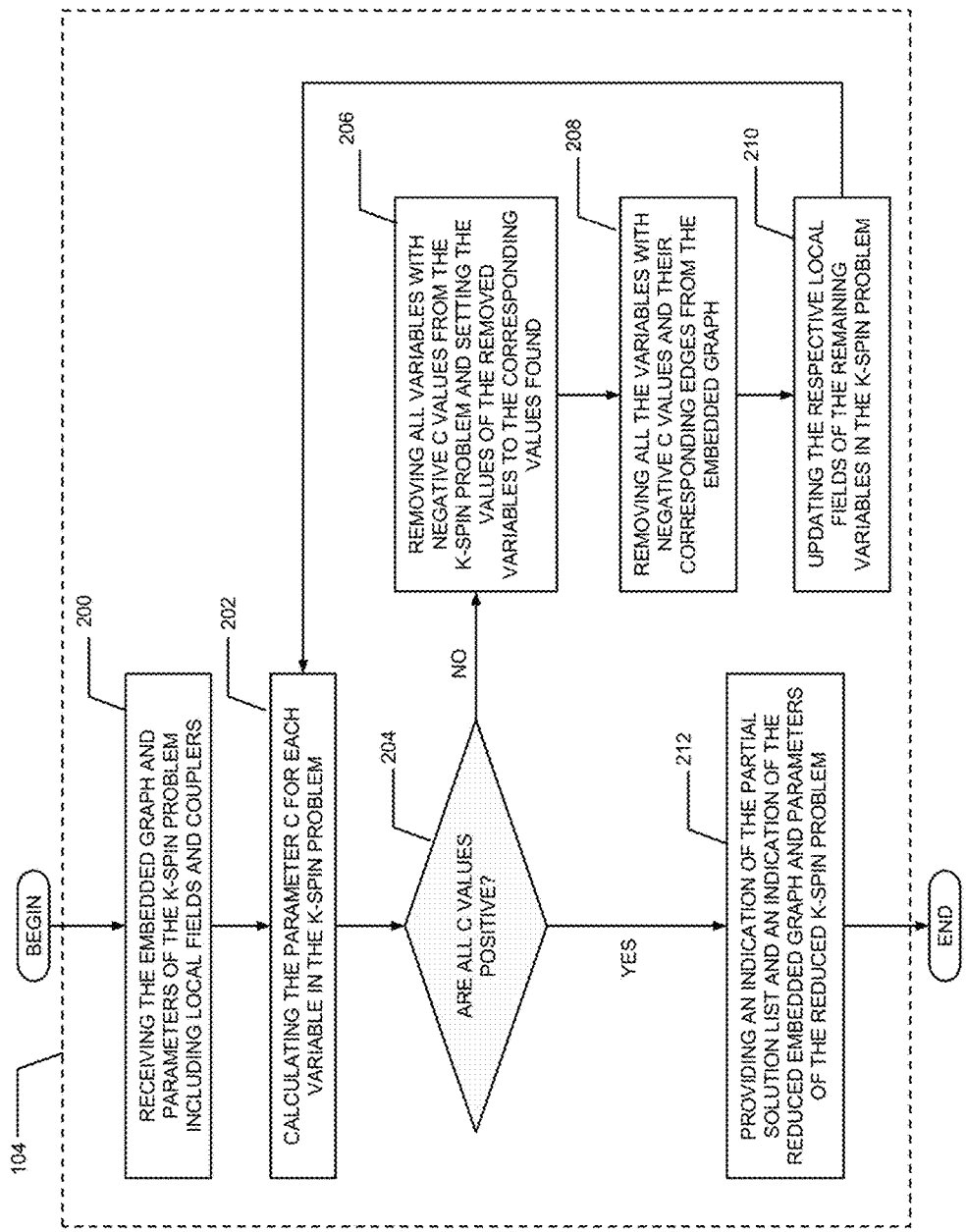
FIG. 2 is a flowchart which describes an embodiment for evaluating a criterion for setting the values of some of the variables and for reducing a number of variables involved in the discrete optimization problem accordingly.

Now referring to FIG. 2, there is shown an embodiment for computing the parameter $C_j$ associated with a local field value and a coupling value of each adjacent edge to the corresponding node j in the K-spin problem and for reducing the embedded graph, if possible.

According to processing step 200, an indication of the embedded graph and the parameters of the K-spin problem including local fields h and couplers J are provided. It will be appreciated that the indication of the embedded graph and the parameters of the K-spin problem including local fields h and couplers J may be provided according to various embodiments. In one embodiment, the embedded graph and the parameters of the K-spin problem including local fields h and couplers J are obtained from the memory unit 610 of the digital computer 502.

According to processing step 202, the parameter $C_j$ is computed for each variable j of the K-spin problem. It will be appreciated that a set of neighboring vertices in the problem graph may be denoted as lnbr(j), which includes all the vertices that are connected to variable j by edges or hyperedges. In one embodiment wherein K=2, the parameter $C_j$ is calculated as $$C_j = \sum_{i \in lnbr(j)} |J_{ji}| - |h_j|.$$

It will be appreciated by the skilled addressee that the formula $$C_j = \sum_{i \in lnbr(j)} |J_{ji}| - |h_j|$$

can be generalized to K-spin problems with K>2.

Still referring to FIG. 2 and according to processing step 204, a test is performed in order to check whether the value of the parameter $C_j$ is positive for all the variables j of the K-spin problem or not. It will be appreciated that the test is performed using the digital computer 502.

If all variables j of the K-spin problem have positive $C_j$ values and in accordance with processing step 212, an indication of a partial solution list comprising the values of the variables set in processing step 206 and the reduced embedded graph and the K-spin problem with updated local field values and coupler values are provided. It will be appreciated that the indication of a partial solution list comprising the values of the variables set in processing step 206 and the reduced embedded graph and the K-spin problem with updated local field values and coupler values are provided using the digital computer 502.

It will be appreciated that if all the variables j of the K-spin problem have positive $C_j$ values, the reduced problem graph is exactly the embedded graph in processing step 200 and the partial solution list is empty.

If at least one variable j of the K-spin problem does not have a positive $C_j$ value and in accordance with processing step 206, the corresponding at least one vertex j with negative $C_j$ value is removed from the problem graph.

It will be further appreciated that all the edges and hyperedges between the vertex j and its neighboring vertices are also removed from the problem graph. The value of the variable j is set based on the sign of its local field $h_j$.

More precisely, if the sign of the local field $h_j$ is positive, the value of the variable j is set at −1 and at +1, otherwise.

Still referring to FIG. 2 and according to processing step 208, the connected subgraph representing the vertex j with the negative $C_j$ value is removed from the embedded graph. All the edges connecting this subgraph to the other vertices in the embedded graph are also removed.

According to processing step 210, the local field values of the remaining variables are updated. It will be appreciated by the skilled addressee that the new effective local field values should be calculated for each remaining variable to replace the previous local field values.

Now referring back to FIG. 1 and according to processing step 106, a test is performed in order to check if all the variables of the K-spin problem have been set or not. It will be appreciated that the test is performed using the digital computer 502.

It will be appreciated that for an input K-spin problem of size N, the values of the set of variables $S^* = \{s_1, s_2, \ldots, s_L\}$ of the K-spin problem are provided as an indication of the result of previous processing step 104.

In fact, it will be appreciated that if the size of the set of variables S* is equal to the size of the K-spin problem, this means that all the variables from the K-spin problem have been set and their values represent the solution to the K-spin problem.

If all the variables have been set in processing step 104 and according to processing step 108, the set of embedded parameters is set to NULL; the problem is completely solved and there is no variable left to embed and solve for.

In the case where not all of the variables of the K-spin problem have been set and according to processing step 110, the parameters of the reduced embedded K-spin problem are set. It will be appreciated that this processing step is performed using the digital computer 502.

Figure 3:
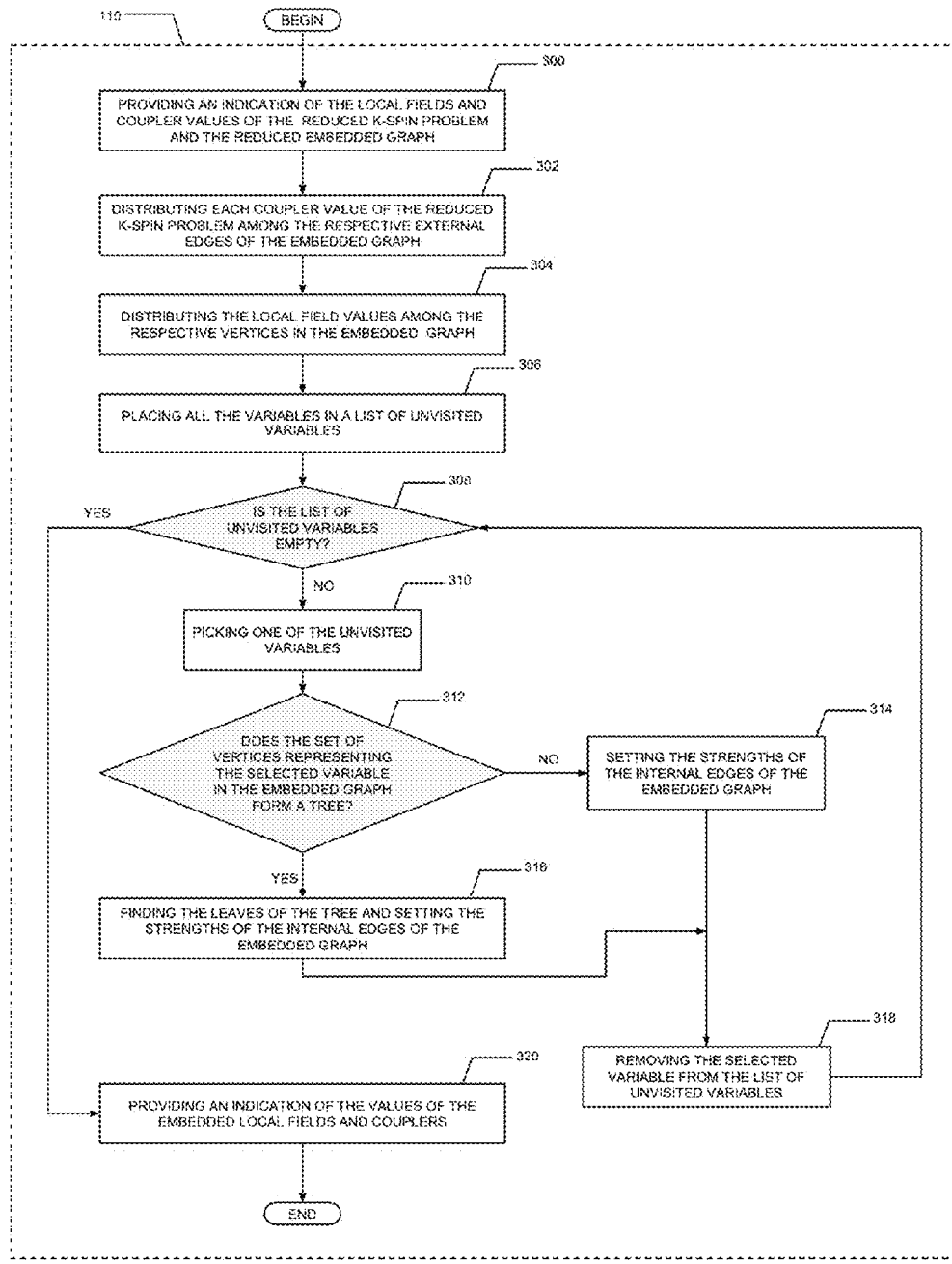
FIG. 3 is a flowchart which describes an embodiment for setting the values of the vertices, the external edges, and the internal edges of the embedded graph of the discrete optimization problem based on whether the connected subgraphs representing each variable of the reduced K-spin problem is a tree graph or not.

Now referring to FIG. 3, there is shown an embodiment for setting the parameters of the reduced embedded K-spin problem.

According to processing step 300, an indication of the local field and the coupler values of the reduced K-spin problem and the reduced embedded graph of the K-spin problem obtained from the processing disclosed in FIG. 2 are provided.

According to processing step 302, each coupler value of the reduced K-spin problem connecting two or multiple variables is distributed among the respective external edges of the embedded graph connecting the same two or multiple variables. It will be appreciated by the skilled addressee that various distributing strategies may be used for distributing the coupler values. In one embodiment, the coupler value can be equally distributed among the respective external edges.

Still referring to FIG. 3 and according to processing step 304, the local field value of each variable j of the reduced K-spin problem is distributed among the respective vertices of the embedded graph representing variable j. The connected subgraph of the embedded graph representing variable j is denoted by $S_j = (V_{S_j}, E_{S_j})$. For each vertex $l \in V_{S_j}$, the set of its neighboring vertices in the embedded graph excluding the neighboring vertices in the set $V_{S_j}$ is denoted by pnbr(l). In one embodiment wherein K=2, the local field value of the vertex $l \in V_{S_j}$ is then $$h_l = \text{sign}(h_j) \left( \sum_{i \in pnbr(l)} |J_{li}| - c_{jk} \right),$$

wherein $$\sum_{k \in V_{S_j}} c_{jk} = C_j$$

(the parameter calculated at processing step 202 of FIG. 2).

It will be appreciated by the skilled addressee that the parameter $C_j$ can be distributed in various ways. In a first embodiment, the parameter $C_j$ can be evenly distributed among all the vertices of the connected subgraph $S_j$. In another embodiment, the parameter $C_j$ can be distributed among the vertices of the connected subgraph $S_j$ proportional to their coupler values.

Still referring to FIG. 3 and according to processing step 306, all the variables of the reduced K-spin problem are stored in a list of unvisited variables.

According to processing step 308, a test is performed in order to check if the list of unvisited variables is empty or not.

If the list of unvisited variables is empty, all variables have been visited and according to processing step 320, an indication of the values of the embedded local field and couplers are provided.

In the case where the list of unvisited variables is not empty and according to processing step 310, one of the variables from the list of unvisited variables is selected.

According to processing step 312, a test is performed in order to check whether the set of vertices representing the selected variable in the embedded graph form a tree graph or not.

It is known to the skilled addressee that a connected subgraph is a tree if the number of its edges equals its number of vertices minus 1.

If the connected subgraph is not a tree and according to processing step 314, the strengths of the internal edges of the connected subgraph (which is not a tree graph) are determined.

For each connected subgraph $S_j$, the values of the parameter $c_{jk}$ are sorted in decreasing order. The sum of all the values except the last one in the ordered list is denoted by $M_j$. The strengths of the internal edges ($e \varepsilon E_{S_j}$) are set at $-M_1-\varepsilon$, where $\varepsilon$ is a small positive value.

In the case where the connected subgraph is a tree and according to processing step 316, the strengths of the internal edges of the connected subgraph (which is a tree graph) are determined. The set of the vertices in graph $S_j$ is divided into two sets of leaves and non-leaves. It will be appreciated that a vertex is a leaf if its degree equals one. The values of the parameter $c_{jk}$ for the vertices in the leaves set are sorted in decreasing order. The sum of all the values except the last one in this ordered list is denoted as $L_j$. Further, the values of the parameter $c_{jk}$ for the vertices in the non-leaves set is added to $L_j$ and the total sum is denoted as $M_j$. The strengths of the internal edges ($e \varepsilon E_{S_j}$) are set at $-M_j-\varepsilon$, where $\varepsilon$ is a small positive value.

According to processing step 318, the selected variable in step 310 is removed from the list of unvisited variables.

According to processing step 320, an indication of the output of the process is obtained. This consists of the values of the local fields and couplers of the embedded graph.

Now referring back to FIG. 1 and according to processing step 112, the reduced K-spin problem is solved using an optimization solver using the corresponding reduced embedded graph and its corresponding J and h parameters. In one embodiment, the optimization solver is the quantum annealer 504.

Still referring to FIG. 1 and according to processing step 114, an indication of the solution obtained by the optimization solver is received and converted to the domain of the discrete optimization problem. This converted solution is combined with the solution obtained from the reduction step described in processing step 104 to return a complete solution to the discrete optimization problem.

Application of the Method Disclosed to an Example

Figures 4A, 4B:
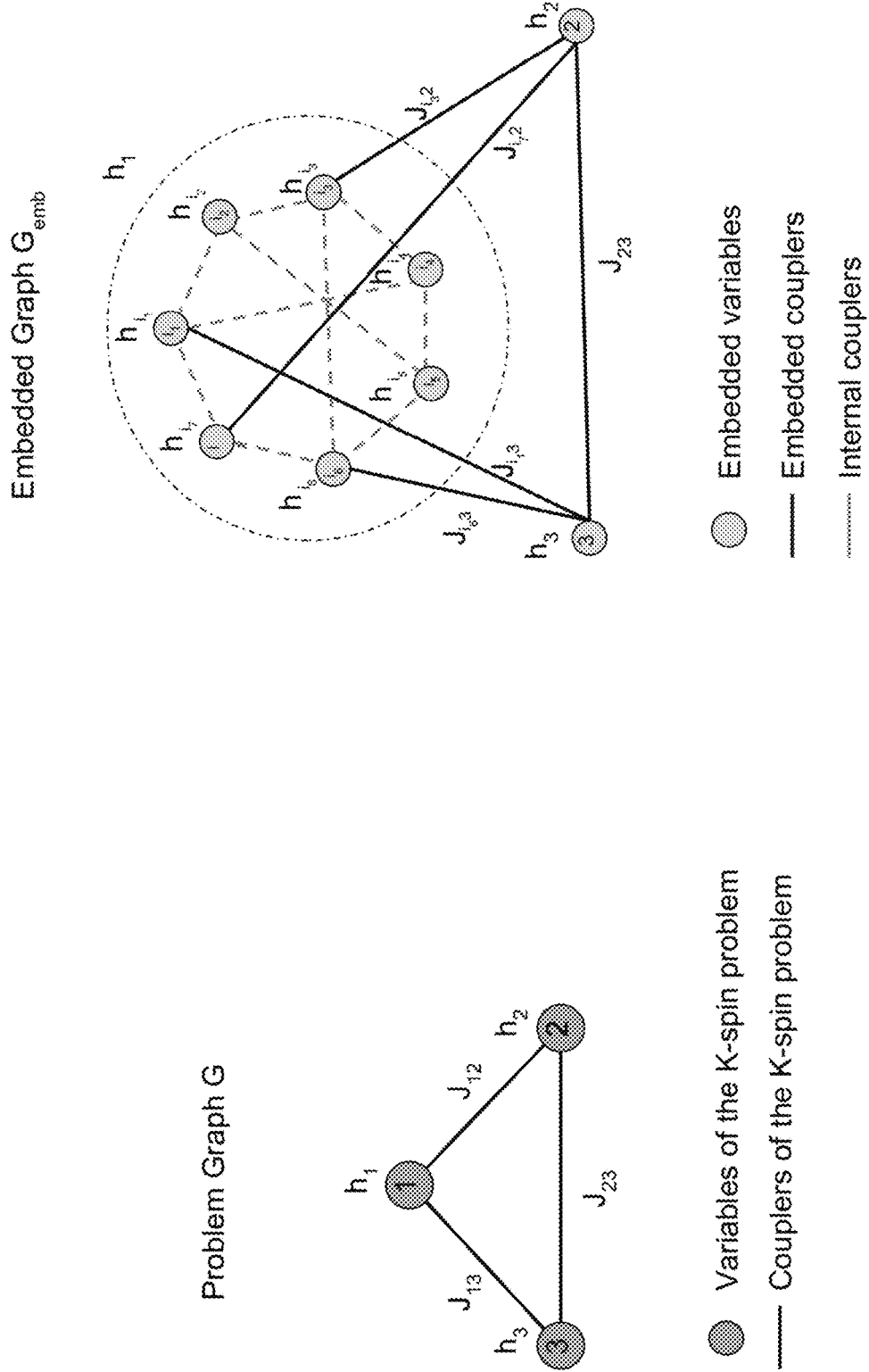
FIG. 4A illustrates a problem graph of an embodiment of a discrete optimization problem.
FIG. 4B illustrates a minor embedding of the embodiment of a discrete optimization problem into a solver graph.

An example of the parameter-setting method disclosed herein can be illustrated considering the discrete optimization problem example shown in FIG. 4A and its minor embedding shown in FIG. 4B.

The problem graph G=(V,E) in FIG. 4A captures the structural information about the K-spin problem which represent a maximum weighted independent set problem $$\max\left(\sum_{i=1}^{3} h_i s_i - \sum_{i,j} J_{ij} s_i s_j\right).$$

In a minor embedding approach, the problem graph G is replaced by a subgraph $G_{emb}=(V_{emb}, E_{emb})$ of the solver graph where each vertex of G is replaced by a connected subgraph of the solver graph. There are various algorithms proposed in the literature to find a minor embedding such as Cai, Jun, William G. Macready, and Aidan Roy, "A practical heuristic for finding graph minors," *arXiv preprint arXiv: 1406.2741* (2014).

FIG. 4B is an illustration of an embedding, wherein the vertices V={1, 2, 3} of the problem graph can be replaced by $V_{emb}=\{[i_1,i_2,i_3,i_4,i_5,i_6,i_7], [2], [3]\}$ and the edges E={(1, 2), (1, 3), (2, 3)} can be mapped to $E_{emb}=\{[(i_3, 2), (i_7, 2)], [(i_1, 3), (i_6, 3)], [(2, 3)]\}$. It can be appreciated that a minor embedding representation is not necessarily unique, and that the example provided here is just for illustrative purposes of the method disclosed.

In this example, there is specifically shown the case where the subgraph from the solver graph representing a variable from the problem graph is not a tree.

a) For each variable V={1, 2, 3}, calculate the C parameters as below:

$C_1 = (|J_{12}| + |J_{13}| - |h_1|)$ $C_2 = (|J_{12}| + |J_{23}| - |h_2|)$ $C_3 = (|J_{13}| + |J_{23}| - |h_3|)$

It is assumed that all C parameters are positive, so there is no variable reduction.

b) Setting the parameter J of each edge of the reduced embedded graph corresponding to an existing edge in the reduced K-spin graph, wherein the defined distributing strategy is considered to be evenly distributing the J parameters:

i) $J_{i_3 2} = J_{i_7 2} = \dfrac{J_{12}}{2}$ ii) $J_{i_1 3} = J_{i_6 3} = \dfrac{J_{13}}{2}$ iii) $J_{23} = J_{23}$ c) Since variables 2 and 3 are directly mapped to only one variable in the solver respectively, their parameters remain unchanged:

$h_2 = h_2$      iv)

$h_3 = h_3$      v)

d) Distributing $C_1$ among the embedded variables $\{i_m\}$ such that $$\sum_{m=1}^{7} c_{i_m} = C_1.$$

e) Setting the values of $\{i_m\}$ $h_{i_1} = \text{sign}(h_1) \times |J_{i_1 3}| - c_{i_1}$     vi)

$h_{i_2} = \text{sign}(h_1) \times (c_{i_2})$     vii)

$h_{i_3} = \text{sign}(h_1) \times (|J_{i_3 2}| - c_{i_3})$     viii)

$h_{i_4} = \text{sign}(h_1) \times (-c_{i_4})$     ix)

$h_{i_5} = \text{sign}(h_1) \times (-c_{i_5})$     x)

$h_{i_6} = \text{sign}(h_1) \times (|J_{i_6 3}| - c_{i_3})$     xi)

$h_{i_7} = \text{sign}(h_1) \times (|J_{i_7 2}| - c_{i_7})$     xii)

f) Sorting $c_{i_m}$ in descending order and denote the sorted values by $c'_{i_m}$.

g) Setting the J parameter of each edge of the embedded graph connecting two vertices representing the same corresponding variable in the reduced K-spin problem:

xiii) $J = -\sum_{m=1}^{6} c'_{i_m} - \epsilon,$ only the 6 higher values are selected and for $\epsilon > 0$ Now the embedded K-spin problem with the calculated h and J parameters is solved by an optimization solver.

It will be appreciated that the method disclosed herein is of great advantage.

A first advantage of the method disclosed herein is that it is not restricted to 2-spin problems and it can be used to set the parameters of an embedded graph of a K-spin (K≥2) problem on any K-spin optimization solver whose graph has a different connectivity than the problem graph.

A second advantage of the method disclosed herein is that it eliminates the computational cost of finding parameters empirically.

A third advantage of the method disclosed herein is that it may further reduce computational cost compared to the existing prior are methods since there is no need to find a spanning tree of the connected subgraph representing one variable.

An advantage of the method disclosed herein is that the processing of a system implementing the method for determining the parameters of a discrete optimization problem embedded to an optimization solver is greatly improved.

Another advantage of the method disclosed herein is that the processing of a system implementing the method for solving a discrete optimization problem embedded to an optimization solver is greatly improved.

It will be appreciated that the method for setting the parameters in an embedded problem which can be a K-spin (K≥2) whose subgraphs representing variables of graph G is not restricted to any particular structure which is of great advantage.

It will be appreciated that a non-transitory computer-readable storage medium is further disclosed. The non-transitory computer-readable storage medium is used for storing computer-executable instructions which, when executed, cause a digital computer to perform a method for setting parameters of a discrete optimization problem embedded to an optimization solver and solving the embedded discrete optimization problem using the optimization solver, the method comprising receiving an indication of a discrete optimization problem and a corresponding embedded graph $G_{emb}$ into the solver graph; converting the discrete optimization problem to a K-spin problem, wherein the K-spin problem is defined as:

$$\min H_{K\text{-}spin} = \sum_{j=1}^{N} h_j s_j + \sum_{k=2}^{K} \sum_{j_1 j_2 \ldots j_k} J_{j_1 j_2 \ldots j_k} s_{j_1} s_{j_2} \ldots s_{j_k}$$

wherein parameter K is the order of the discrete optimization problem, further wherein parameter J is a coupling value between two vertices and parameter h is a local field value; for each variable j of the K-spin problem associated with a corresponding node: computing a parameter $C_j$ associated with the local field and the coupling values of each adjacent edge to the corresponding node, evaluating if a variable selection criterion is met with the computed parameter $C_j$, if the variable selection criterion is met setting a value of a selected variable j to a given fixed value, adding the selected variable j with the given fixed value to a partial solution list, and removing the selected variable from the K-spin problem and from the corresponding embedded graph to thereby provide a reduced K-spin problem and a corresponding reduced embedded graph, the corresponding reduced embedded graph comprising a plurality of edges and vertices; setting the parameter J of each edge of the reduced embedded graph corresponding to an existing edge in the corresponding reduced K-spin problem by distributing the parameter J in the reduced K-spin problem according to a defined distributing strategy; setting the parameter h of each given vertex of the reduced embedded graph by distributing the corresponding parameter h in the reduced K-spin problem using a linear combination of a corresponding parameter C for the given vertex and the parameter J of each edge of the corresponding variable in the reduced K-spin problem adjacent to the given vertex; setting the parameter J of each edge of the reduced embedded graph connecting two vertices representing the same corresponding variable in the reduced K-spin problem using a distribution of the parameter C of the corresponding variable in the reduced K-spin problem calculated previously; solving the reduced K-spin problem with the optimization solver using the corresponding reduced embedded graph and its corresponding h and J parameters to provide at least one solution; and combining the at least one solution obtained from the optimization solver with the partial solution list to thereby provide a solution to the discrete optimization problem.

Although the above description relates to a specific preferred embodiment as presently contemplated by the inventor, it will be understood that the invention in its broad aspect includes functional equivalents of the elements described herein.

The invention claimed is:

1. A method for setting parameters of a discrete optimization problem embedded to an optimization solver hardware and solving the embedded discrete optimization problem using the optimization solver hardware, the method comprising:

use of a processing unit for:
receiving an indication of a discrete optimization problem and a corresponding embedded graph $G_{emb}$ into an optimization solver hardware graph;

converting the discrete optimization problem to a K-spin problem, wherein the K-spin problem is defined as:

$$\min H_{K\text{-}spin} = \sum_{j=1}^{N} h_j s_j + \sum_{k=2}^{K} \sum_{j_1 j_2 \cdots j_k} J_{j_1 j_2 \cdots j_k} s_{j_1} s_{j_2} \cdots s_{j_k}$$

wherein parameter K is the order of the discrete optimization problem, parameter J is a coupling value between two vertices, parameter h is a local field value, $s_j$ is the jth variable of a K-spin problem which can take a value from $\{-1, +1\}$, $J_{j_1 j_2 \ldots j_k}$ denotes the magnitude of a kth order interaction and $s_{j_1} s_{j_2} \ldots s_{j_k}$ represents a kth order interaction between variable $j_1 j_2$ and $j_k$;
for each variable j of the K-spin problem associated with a corresponding node:
  computing a parameter $C_j$ associated with the local field and the coupling values of each adjacent edge to the corresponding node,
  evaluating if a variable selection criterion is met with the computed parameter $C_j$,
  if the variable selection criterion is met with the computed parameter $C_j$:
    setting a value of a selected variable j to a given fixed value,
    adding the selected variable j with the given fixed value to a partial solution list, and
    removing the selected variable from the K-spin problem and from the corresponding embedded graph to thereby provide a reduced K-spin problem and a corresponding reduced embedded graph, the corresponding reduced embedded graph comprising a plurality of edges and vertices;
setting the parameter J of each edge of the reduced embedded graph corresponding to an existing edge in the corresponding reduced K-spin problem by distributing the parameter J in the reduced K-spin problem according to a defined distributing strategy;
setting the parameter h of each given vertex of the reduced embedded graph by distributing the corresponding parameter h in the reduced K-spin problem using a linear combination of a corresponding parameter C for the given vertex and the parameter J of each edge of the corresponding variable in the reduced K-spin problem adjacent to the given vertex;
setting the parameter J of each edge of the reduced embedded graph connecting two vertices representing the same corresponding variable in the reduced K-spin problem using a distribution of the parameter C of the corresponding variable in the reduced K-spin problem calculated previously;
solving the reduced K-spin problem with the optimization solver hardware using the corresponding reduced embedded graph and its corresponding h and J parameters to provide at least one solution;
combining the at least one solution obtained from the optimization solver hardware with the partial solution list to thereby provide a solution to the discrete optimization problem; and
wherein the optimization solver hardware is a quantum annealer.

2. The method as claimed in claim 1, wherein the discrete optimization problem is formulated as a quadratic optimization problem.

3. The method as claimed in claim 1, wherein the discrete optimization problem is formulated as a 2-spin problem.

4. The method as claimed in claim 1, wherein the indication of a discrete optimization problem and the corresponding embedded graph $G_{emb}$ into the optimization solver hardware graph are obtained from one of a user interacting with the processing unit, a memory unit operatively connected to the processing unit and a remote processing device operatively connected to the processing unit.

5. The method as claimed in claim 1, wherein the parameter $C_j$ is defined as $$C_j = \sum_{i \in lnbr(j)} |J_{ji}| - |h_j|,$$

wherein lnbr(j) is a set of neighboring vertices which includes all vertices that are connected to variable j by edges or hyperedges.

6. The method as claimed in claim 1, wherein the evaluating if a variable selection criterion is met with the computed parameter $C_j$ comprises determining if the computed parameter $C_j$ is negative.

7. The method as claimed in claim 1, wherein the defined distributing strategy comprises equally distributing the parameter j in the reduced K-spin problem.

8. A digital computer for setting parameters of a discrete optimization problem embedded to an optimization solver hardware and solving the embedded discrete optimization problem using the optimization solver hardware, the digital computer comprising:
  a central processing unit;
  a display device;
  a communication port;
  a memory unit comprising an application for setting parameters of a discrete optimization problem embedded to the optimization solver hardware and solving the embedded discrete optimization problem using the optimization solver hardware, the application comprising:
    instructions for receiving an indication of a discrete optimization problem and a corresponding embedded graph $G_{emb}$ into an optimization solver hardware graph;
    instructions for converting the discrete optimization problem to a K-spin problem, wherein the K-spin problem is defined as:

$$\min H_{K\text{-}spin} = \sum_{j=1}^{N} h_j s_j + \sum_{k=2}^{K} \sum_{j_1 j_2 \cdots j_k} J_{j_1 j_2 \cdots j_k} s_{j_1} s_{j_2} \cdots s_{j_k}$$

wherein parameter K is the order of the discrete optimization problem, parameter J is a coupling value between two vertices, parameter h is a local field value, $s_j$ is the jth variable of a K-spin problem which can take a value from $\{-1, +1\}$, $J_{j_1 j_2 \ldots j_k}$ denotes the magnitude of a kth order interaction and $s_{j_1} s_{j_2} \ldots s_{j_k}$ represents a kth order interaction between variable $j_1 j_2$ and $j_k$;
    instructions for, for each variable j of the K-spin problem associated with a corresponding node,
      computing a parameter $C_j$ associated with the local field and the coupling values of each adjacent edge to the corresponding node, evaluating if a variable selection criterion is met with the computed parameter $C_j$,
if the variable selection criterion is met:
setting a value of a selected variable j to a given fixed value,
adding the selected variable j with the given fixed value to a partial solution list, and
removing the selected variable from the K-spin problem and from the corresponding embedded graph to thereby provide a reduced K-spin problem and a corresponding reduced embedded graph, the corresponding reduced embedded graph comprising a plurality of edges and vertices;
instructions for setting the parameter J of each edge of the reduced embedded graph corresponding to an existing edge in the corresponding reduced K-spin problem by distributing the parameter J in the reduced K-spin problem according to a defined distributing strategy;
instructions for setting the parameter h of each given vertex of the reduced embedded graph by distributing the corresponding parameter h in the reduced K-spin problem using a linear combination of a corresponding parameter C for the given vertex and the parameter J of each edge of the corresponding variable in the reduced K-spin problem adjacent to the given vertex;
instructions for setting the parameter J of each edge of the reduced embedded graph connecting two vertices representing the same corresponding variable in the reduced K-spin problem using a distribution of the parameter C of the corresponding variable in the reduced K-spin problem calculated previously;
instructions for solving the reduced K-spin problem with the optimization solver hardware using the corresponding reduced embedded graph and its corresponding h and parameters to provide at least one solution; and
instructions for combining the at least one solution obtained from the optimization solver hardware with the partial solution list to thereby provide a solution to the discrete optimization problem;
a data bus for interconnecting the central processing unit, the display device, the communication port and the memory unit; and
wherein the optimization solver hardware is a quantum annealer.

9. A non-transitory computer-readable storage medium for storing computer-executable instructions which, when executed, cause a digital computer to perform a method for setting parameters of a discrete optimization problem embedded to an optimization solver hardware and solving the embedded discrete optimization problem using the optimization solver hardware, the method comprising:
use of a processing unit for:
receiving an indication of a discrete optimization problem and a corresponding embedded graph $G_{emb}$ into an optimization solver hardware graph;
converting the discrete optimization problem to a K-spin problem, wherein the K-spin problem is defined as:

$$\min H_{K\text{-}spin} = \sum_{j=1}^{N} h_j s_j + \sum_{k=2}^{K} \sum_{j_1 j_2 \ldots j_k} J_{j_1 j_2 \ldots j_k} s_{j_1} s_{j_2} \ldots s_{j_k}$$

wherein parameter K is the order of the discrete optimization problem, parameter J is a coupling value between two vertices, parameter h is a local field value, $s_j$ is the jth variable of a K-spin problem which can take a value from $\{-1, +1\}$, $J_{j_1 j_2 \ldots j_k}$ denotes the magnitude of a kth order interaction and $s_{j_1} s_{j_2} \ldots s_{j_k}$ represents a kth order interaction between variable $j_1 j_2$ and $j_k$;
for each variable j of the K-spin problem associated with a corresponding node:
computing a parameter $C_j$ associated with the local field and the coupling values of each adjacent edge to the corresponding node,
evaluating if a variable selection criterion is met with the computed parameter $C_j$,
if the variable selection criterion is met:
setting a value of a selected variable j to a given fixed value,
adding the selected variable j with the given fixed value to a partial solution list, and
removing the selected variable from the K-spin problem and from the corresponding embedded graph to thereby provide a reduced K-spin problem and a corresponding reduced embedded graph, the corresponding reduced embedded graph comprising a plurality of edges and vertices;
setting the parameter J of each edge of the reduced embedded graph corresponding to an existing edge in the corresponding reduced K-spin problem by distributing the parameter J in the reduced K-spin problem according to a defined distributing strategy;
setting the parameter h of each given vertex of the reduced embedded graph by distributing the corresponding parameter h in the reduced K-spin problem using a linear combination of a corresponding parameter C for the given vertex and the parameter J of each edge of the corresponding variable in the reduced K-spin problem adjacent to the given vertex;
setting the parameter J of each edge of the reduced embedded graph connecting two vertices representing the same corresponding variable in the reduced K-spin problem using a distribution of the parameter C of the corresponding variable in the reduced K-spin problem calculated previously;
solving the reduced K-spin problem with the optimization solver hardware using the corresponding reduced embedded graph and its corresponding h and J parameters to provide at least one solution;
combining the at least one solution obtained from the optimization solver hardware with the partial solution list to thereby provide a solution to the discrete optimization problem; and
wherein the optimization solver hardware is a quantum annealer.

* * * * *